Figure 1:
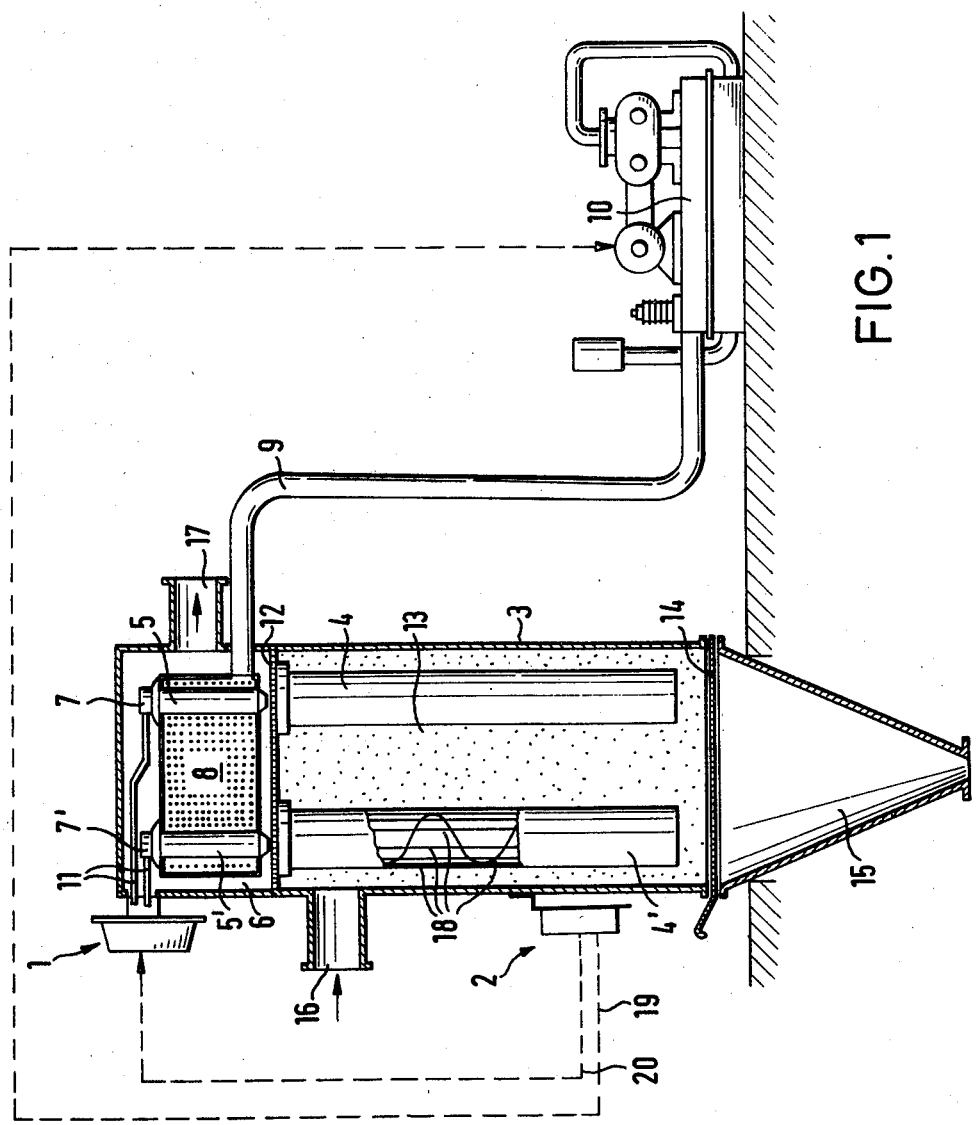

United States Patent [19]

Oetiker et al.

[11] 4,299,597
[45] Nov. 10, 1981

[54] PROCESS AND FILTER CONTROL SYSTEM FOR THE CYCLIC COUNTER-SCAVENGING OF DIAPHRAGM-ACTIVATED FILTER HOSES

[75] Inventors: Hans Oetiker, St. Gallen; Emanuel Kummer, Gossau; Kurt Rusterholz, Jona; Hermann Gämperle, Bronschhofen, all of Switzerland

[73] Assignee: Gebruder Buhler AG, Uzwil, Switzerland

[21] Appl. No.: 121,509

[22] Filed: Feb. 14, 1980

[30] Foreign Application Priority Data

Feb. 19, 1979 [DE] Fed. Rep. of Germany ....... 2906353

[51] Int. Cl.³ ................... B01D 46/04; F16K 31/45
[52] U.S. Cl. .......................................... 55/96; 55/273; 55/284; 55/302; 137/624.11; 137/625.11
[58] Field of Search .................. 55/96, 272, 273, 283, 55/284, 287, 302; 137/624.11, 625.11

[56] References Cited

U.S. PATENT DOCUMENTS

| | | | |
|---|---|---|---|
| 2,995,143 | 8/1961 | Strathearn et al. | 137/624.11 |
| 3,390,512 | 7/1968 | Hanes | 55/96 |
| 3,394,532 | 7/1968 | Oetiker | 55/302 |
| 3,788,593 | 1/1974 | Cohen | 137/624.11 |
| 3,838,555 | 10/1974 | Kubiak | 55/96 |
| 3,931,832 | 1/1976 | Hodler et al. | 137/624.11 |
| 3,948,623 | 4/1976 | Ostby et al. | 55/96 |

FOREIGN PATENT DOCUMENTS

| | | |
|---|---|---|
| 2233529 | 2/1973 | Fed. Rep. of Germany . |
| 2754757 | 1/1979 | Fed. Rep. of Germany ........ 55/302 |
| 2032619 | 11/1970 | France . |
| 2156378 | 5/1973 | France . |
| 2156764 | 6/1973 | France . |
| 2269363 | 11/1975 | France . |
| 812244 | 4/1959 | United Kingdom . |
| 1228784 | 4/1971 | United Kingdom . |
| 1243231 | 8/1971 | United Kingdom . |
| 1256086 | 12/1971 | United Kingdom . |
| 1402166 | 8/1975 | United Kingdom . |
| 544451 | 2/1977 | U.S.S.R. . |

*Primary Examiner*—David L. Lacey
*Attorney, Agent, or Firm*—Oblon, Fisher, Spivak, McClelland & Maier

[57] ABSTRACT

A method and apparatus for the cyclical counter-scavenging of filter hoses, particularly the control thereof, is disclosed. According to the present invention, the counter-scavenging of filter hoses is accomplished by gas blasts whose timing and duration are controlled by a fluid control apparatus. The fluid control apparatus consists of a drum distributor having an arm whose position controls the timing of the counter-scavenging blasts, and a valve whose activation controls the duration of the counter-scavenging blasts. The drum distributor and the valve are independently controllable by an electronic circuit including timing signals and control circuitry receiving the timing signals and converting these signals into activating signals for the drum distributor and the valve.

17 Claims, 7 Drawing Figures

PROCESS AND FILTER CONTROL SYSTEM FOR THE CYCLIC COUNTER-SCAVENGING OF DIAPHRAGM-ACTIVATED FILTER HOSES

The invention relates to a process for the cyclic counter-scavenging of filter hoses whereby individual diaphragm valves of a valve group, provided for the filter hoses, are cyclically activated.

The invention relates, furthermore, to a filter system for the cyclic activtion of individual diaphragm valves of a group of valves for the counter-scavenging of filter hoses, particularly for the performance of the aforementioned process.

The invention further relates, in the first place, to the aforemention process for the cyclic counter-scavenging of filter hoses and the aforementioned filter control system for the cyclic activation of individual diaphragm valves in mill filters which does, however, not exclude industrial filters.

Filter hoses are used more and more in the industrial cleaning of the dust-laden air. It is also required in modern plants that the filter can be kept in operation without interruption. This necessitates, however, the automatic cleaning of the filter hoses. The so-called filter scavenging process according to the German Pat. No. 1,407,922 is widely used by industry. In this instance, the dust-laden air penetrates through the filter hoses from the outside and is collected as cleaned air at the upper outlet end of the filter hoses and, depending on the system, it is again released into the plant or into the open. Even though each individual filter hose can process a comparatively large amount of air and dust, a very large number of filter hoses is necessary owing to the enormous charge of air as well as of dust.

Two types of filters are predominating today.

In grain mills and similar plants, the principle decentralized air cleaning with comparatively small filter units is applied because of the multitude of the sources of dust-laden air. These filters have, as a rule, 10 to 50 individual filter hoses and, in extreme cases, up to 100 of them. Often 10 to 20 of such filter units are used in a mill. The great advantage of this system lies in the fact that the air collecting lines can be installed in the plant and also that the filter can be accommodated in the mill building. The placing of the filter in the building of the mill has the advantage that condensation problems can be avoided. Such filters are often called mill filters.

The second type of filter can be called an industrial filter. It is mostly applied in the chemical, plastics or cement and other industries. In these instances, the dirty air is, as a rule, centrally collected and cleaned in comparatively large filters. These filters have 100 to 1000 and sometimes more than 1000 filter hoses. The main air collection line has a diameter of 1 to 2 m and more. For this reason, but also because of the size of the filter, this system must be installed in the open air.

In the case of the mill filters, mostly low pressure air is used of less than $2 \times 10^5$ N/m² ($2 \times 10^5$ Pascal or 2 bar or 1 atü excess pressure), as a rule, $1.5 \times 10^5$ N/m² ($1.5 \times 10^5$ Pascal or 1.5 bar or 0.5 atü excess pressure). The low pressure can be produced free from oil with diaphragm or disk piston blowers. In order to obtain a sufficiently high efficiency for the counter-scavenging in spite of relatively low-pressure scavenging air, a counter-scavenging valve must be provided for each individual filter hose. The mill filter has, therefore, the same number of filter hoses as it has counter-scavenging valves, i.e., for example, 10 to 100 units. The mill filter must generally collect a large number of individual sources of dust-laden air. Often, the individual air consumers also react extremely sensitively to fluctuations in the quantities of air.

During the counter-scavenging process, not only is a filter hose put out of operation but a lot of energy in the form of counter-scavenging air is still blown into the filter casing. As a general rule, it is now assumed that not more than 1/15 to 1/30 of the filter hoses are to be cleaned simultaneously in order to avoid damage, especially undesirable reactions in the flow conditions of the air consumers. In practice, the scavenging process takes generally less than 1 second, frequently even only 0.1 to 0.3 seconds. In the case of a filter with several, for example, 25 filter hoses, all filter hoses are, cyclically and individually, subjected to the counter-scavenging and thus cleaned in time intervals of 10 to 60 seconds, depending on the air and dust loads. When all filter hoses are cleaned, the cycle starts automatically from the beginning.

The industrial filter operates in a similar fashion, only that there are a number of, for example, 10 filter hoses acted upon through a joint distribution line and a joint valve. If the filter has 200 to 300 filter hoses, 20 to 30 valves must be controlled.

The development of the control of the scavenging air valves and accordingly also that of the entire filter system has gone through several transformations in the last decades. After mechanical and electrical controls were already known, electric-electronic control units were used with great success all over the world by the beginning of the 60's. Recently, the applicants attempted a further step forward with the application of a fluidal control according to the German Pat. No. 2 233 529—and this after the corresponding electric-mechanical control technique has been offering equal safety in operation for many years. However, a fluidal control has two convincing advantages. The filter can be controlled with the energy, i.e. the compressed air, already existing within it. Furthermore, a fluidal control is explosionproof since it cannot cause any explosions.

As to the mill filter, it was believed—if one did not want to give up the proven principle of the cleaning of individual hoses—that, so-to-speak, the end of the development had been reached. Accordingly, recently more and more efforts have become known to reduce in size the so-called high pressure industrial filters with 2 to 8 bar compressed air for use as mill filters. Since, theoretically, ten times fewer valves would then be required, the necessary control system could also be reduced accordingly. This, in its turn, would theoretically lead to the fact that a correspondingly scaled-down industrial filter could be produced at lower costs than the mill filter used so far.

The invention has as an object to further develop the generic process in such a way that, by largely maintaining its present advantages, especially the usability of oil-free low pressure air which is almost law in the food industry, the controllability of the cycle is improved.

This object is accomplished by the fact that, according to the invention, clock signals are electronically produced independently of the activation cycle and these are transformed into fluidal control signals for the diaphragm valves.

The invention furthermore, has as an object to improve the generic filter control system in such a way that, by largely maintaining its present advantages, it can be produced more economically and be better controllable.

The latter task is accomplished in accordance with the invention by the fact that an electronic control unit is provided for the production of electronic clock signals and fluidal control means follow this control unit for the activation of the diaphragm valves. The electronic production of clock signals has the advantage that it can be carried out at extremely low cost since any electronic clock, for example an oscillator crystal, can be used for this purpose. The independence of the clock signals from the activation cycle has the advantage that several control dimensions determining the cyclic activation of the diaphragm valves are controllable independently of each other. This advantage shows up particularly clearly in comparison with the counter-scavenging known from the German Pat. No. 1 407 922. The question of the electronic controllability of individual diaphragm valves is actually also addressed in the known process or in the known filter control system but the two control signals or control means for the control of the time intervals between two scavenging actions and the duration of the scavenging action are coupled so rigidly with each other that the interval between the scavenging action and the duration of the scavenging action are only jointly changeable, and in a constant ratio towards each other. However, surprisingly, the indicated connection of electronic clock signals with fluidal control signals or the indicated connection of an electronic control unit with a subsequent fluidal control means has also produced additional advantages. Only very little outside energy, in the form of electrical current, is required for the production of the electronic clock signals. However, those operating elements which require the main energy, i.e. the diaphragm valves, are activated through fluidal control signals or fluidal control means. And, for this purpose, the compressed air which is available in any case in the mill can be used.

The electronic clock signals are preferably transformed into two groups of fluidal control signals which are independent of each other for the mutually independent control of the duration of the scavenging action and of the intervals between the scavenging actions whereby the one group controls the duration of the scavenging action and the other group the intervals between the scavenging actions. In this manner, the duration of the scavenging action and the intervals between the scavenging actions can be controlled independently of each other and in an optimum way to the respective operating conditions. This possibility is of great advantage since it was demonstrated by means of test series that the optimum ratio of these two process parameters changes as a function of the operating conditions in a given filter system.

Preferably, at least a first electromechanical transducer unit controllable by the clock signals is installed between the electronic control unit and the fluidal control means for the transformation of the electronic clock signals into fluidal control signals. In continuation of this line of thinking, two electromechanical transducer units, independent of each other and controllable by the clock signals, are preferably installed between the electronic control unit and the fluidal control means. With the help of these two electromechanical transducer units, the duration of the scavenging action and the intervals between the scavenging actions can be particularly easily changed independently of each other. Preferably, the electronic clock signals are transformed, in this instance, into mechanical motion and this, in its turn, into fluidal control signals by means of electrodynamic or electrostatic fields. Even though, initially, doubts arose as to whether such a mixed system would be less expensive and more appropriate for the customer—after all, experts for electronic, electrical and flow matters may be required—it turned out after the implementation of the invention that this mixed system could be surprisingly easily handled and had an extremely high operating safety and precision.

A considerable simplification of the fluidal control means required in the filter control system can be achieved by the fact that they have a drum distributor as it is described, for example, in the Germal Pat. No. 2 233 529. This leads to the advantage that the control of the valve diaphragms of the individual filter hoses can be carried out with only one air relief valve preferably arranged at the inlet to the drum distributor.

In order to be able to get along with small cross-sections of the fluidal control lines on the inlet side but to be able to initiate, at the same time, a sufficiently strong scavenging action in the filter hoses, one servo valve each is installed in front of the diaphragm valve and is connected with an outlet of the drum distributor in a preferred embodiment.

The size of the drum distributor, particularly its diameter, can be reduced by connecting at least two, preferably three or four, servo valves with an outlet of the drum distributor.

The precision of the positioning of the arm of the drum distributor with respect to the drum distributor outlets is considerably increased by the fact that a stepping motor is provided as an electromechanical transducer unit which drives the drum distributor arm and is clocked by the electronic control unit. In this context, use is made of the fact that the clock-like movement of the rotor in the stepping motor is exactly determined by the stationary arrangement of the phase poles. The geometry given to the stepping motor is quasi reproduced in a clear manner on the motion plane of the drum distributor by means of the connection between the arm of the drum distributor and the stepping motor. By means of a suitable transmission or reduction gear, respectively, between the stepping motor and the drum distributor, the reproduction can be performed in such a way that each stator pole is precisely reproduced on an outlet of the drum distributor. In this case, the reduction ratio of the reduction gear is preferably selectable so that the very same stepping motor can be used for drum distributors of different geometries.

A unipolar stepping motor can be controlled in an especially simple manner from the switching point of view.

The stepping motor and the drum distributor can be easily adjusted relative to each other in that the stepping motor and the drum distributor are arranged in a parallel-axial manner and the stepping motor can be swiveled in a plane vertical to the axes, preferably within an angular range of approximately 15°.

Preferably, the drum distributor itself is designed as a stepping motor. In this way, an additional simplification of the filter control system is achievable. Owing to this measure, the necessity of a reduction gear and of a prior position adjustment of the stepping motor to the drum distributor is eliminated. In this instance, the rotor of the stepping motor takes over the function of the distributor arm in the drum distributor; the locations of the stator poles of the stepping motor correspond here to the locations of the outlets of the drum distributor. This exemplified embodiment shows especially clearly the advantage of the mixed control system since the fluidal control dimensions do not undergo any interaction with the electromagnetic control dimensions and, therefore, can be arranged directly next to each other or on top of each other without influencing each other in a disadvantageous manner.

In accordance with another preferred design, the turning shaft of the drum distributor is guided in ball bearings whereby the ball bearings rest pressure-tight through O-rings against the wall of an axial borehole in the drum distributor block. This measure achieves a production advantage to the effect that the turning shaft of the drum distributor can be arranged in the axial borehole of the distributor block with a simple seat but, at the same time, a pressure fluid-tight sealing is guaranteed between the wall of the axial borehole and the ball bearings.

Preferably, the stepping motor, the drum distributor and the air relief valve are put together to form one component and the electronic control unit another component. This one-component system has the advantage that the parts which neither are to be operated nor need maintenance are arranged separately from those units which have at least devices for their operation. Thus, for example, the stepping motor, the drum distributor and the air relief valve can be rigidly mounted on the upper part of the filter and the electronic unit on the wall of the building at an operational level.

The electronic control unit is preferably designed in such a way that the time interval between two activations of the air relief valve and/or the duration of the valve activation can be changed independently of each other whereby the time interval between two valve activations is preferably adjustable within the range from 0.5 seconds to 10 minutes, particularly from 2 to 100 seconds, and the duration of the valve activation preferably within the range from 30 milli-seconds to 1 second, particularly from 30 to 150 milli-seconds. The two essential operating parameters for the air relief valves are optionally adjustable by this design of the electronic control unit.

A special cleaning effect can be achieved in that the air-relief valve is designed in such a manner that it can be activated several times quickly and successively by means of a chain of pulses. In this way, a kind of a knocking effect is exerted on the filter hose.

Preferably, an electropneumatic valve is provided as air relief valve. Such a valve has already proven its reliability and can easily be controlled by means of electronic clock pulses.

The air relief valve is preferably installed in such a way that it is closed when not under current. This avoids an undesirable pressure drop in case of a failure of the electric current. Furthermore, it is of advantage to equip the filter control system with a safety system which, with the failure of the air supply, cuts out the electric-electronic portion and/or emits an alarm signal. The safety of the filter control system is further increased by means of this measure and undesirable reactions which would occur with the failure of the air supply are largely avoided.

In accordance with a particularly preferred design of the filter control system, the electromechanical transducer unit is surrounded by a pressure-tight sealed casing filled with an inert gas. In this way, the filter control is rendered explosion-proof so that it offers the advantages of a purely fluidal control also in this regard. This safety measure can be achieved at small additional cost since a comparatively low amount of gas is required for the fluidal control of the diaphragm valves. This applies in particular when a servo valve is installed in front of each diaphragm valve. In comparison, such a measure could only have been taken with a comparatively high financial investment with the electric-electronic control used so far.

The ease of the control of the filter control system is further increased in that a control system for the indication of each scavenging clock signal is connected with the electronic control unit. In this way, it can immediately be determined whether the electronic system is properly operating. An additional increase in the ease of the control is achievable in that a control system for the indication of each scavenging action as performed is connected with the air relief valve. It is especially preferred when the filter control system according to the invention is simultaneously equipped with the control system for the indication of the scavenging clock signal and the control system for the indication of each scavenging action as performed. A certain pre-localization of the causes of breakdowns can be immediately effected in this way.

In order to further increase the operating safety of the filter control system according to the invention, it is advantageous to provide a scaling hammer in the filter discharge which is controlled by the electronic control unit. In this way, the formation of bridges in the filter discharge which could lead to undesirable pressure fluctuations in the space with the dust-laden air or in the filter hoses involving clogging in the filter discharge are avoided.

The electronic control unit can be made with simple means, preferably with a timing pulse generator and two counting devices installed in parallel behind the timing pulse generator whereby the output of one of the counting devices is assigned to the control input of the electromechanical transducer unit of the air relief valve, the other counting device has several outputs and each counted output is assigned exactly to an output of the other counting device and this output exactly to a phase winding of the stepping motor.

In the case of this design of the electronic control unit, the output of the one counting device has preferably a response behavior with time-delay in comparison with the outputs of the other counting device. It is ensured in this way that the scavenging action is only triggered after the distributor arm of the drum distributor is placed into its exact position with the help of the stepping motor. One counting device in the electronic control unit for the emission of control signals is preferably designed in such a way that these signals always consist of pulse chains for the counter-scavenging of the filter hoses by means of several scavenging actions effected successively and in short intervals.

In accordance with a particularly preferred and simple design, the electronic control unit has a timing pulse generator, a counter installed behind the timing pulse generator whose outputs are clearly assigned to a phase winding of the stepping motor and a monostable flip-flop circuit installed behind one of the outputs of the counter which is connected with the control input of the scavenging valve. As a further modification of the control unit, devices, preferably potentiometers, are provided with the help of which the interval between the pulses emitted by the oscillator and the duration of the pulses emitted by the monostable flip-flop circuit can be changed independently of each other. In this way, an easy controllability of the intervals between the scavenging actions and of the duration of the scavenging action is obtained. Preferably, an additional flip-flop circuit is connected to the output of the monostable flip-flop circuit provided for the scavenging valve which controls a hammer valve for the activation of the scale hammer. In order to ensure that the scavenging action is only effected when the distributor arm in the drum distributor is fluidly connected with a diaphragm valve arrrangement, the monostable flip-flop circuit installed in front of the scavenging valve is designed in such a way that it responds to the decaying edge of the pulse. Also the monostable flip-flop assigned to the hammer valve is designed in such a way that it responds to the decaying edge of the pulse. It is ensured in this manner that the scaling action is effected only after the scavenging action.

Overall, the preferred electronic control unit is characterized by the fact that it does not only permit a precise control, as it is made possible by electronics, with especially simple means but that it permits additionally the formation of decentralized command units especially for mill systems which can be put in and out of operation by means of simple electrical control means incorporated in a central system control. Particularly if the entire system is blocked with electronic control means, an electronic clock is provided for the smallest operating unit, i.e. to each individual mill filter.

The invention is further described below with the help of exemplified embodiments and with reference to the attached schematic illustration.

Figure 2:
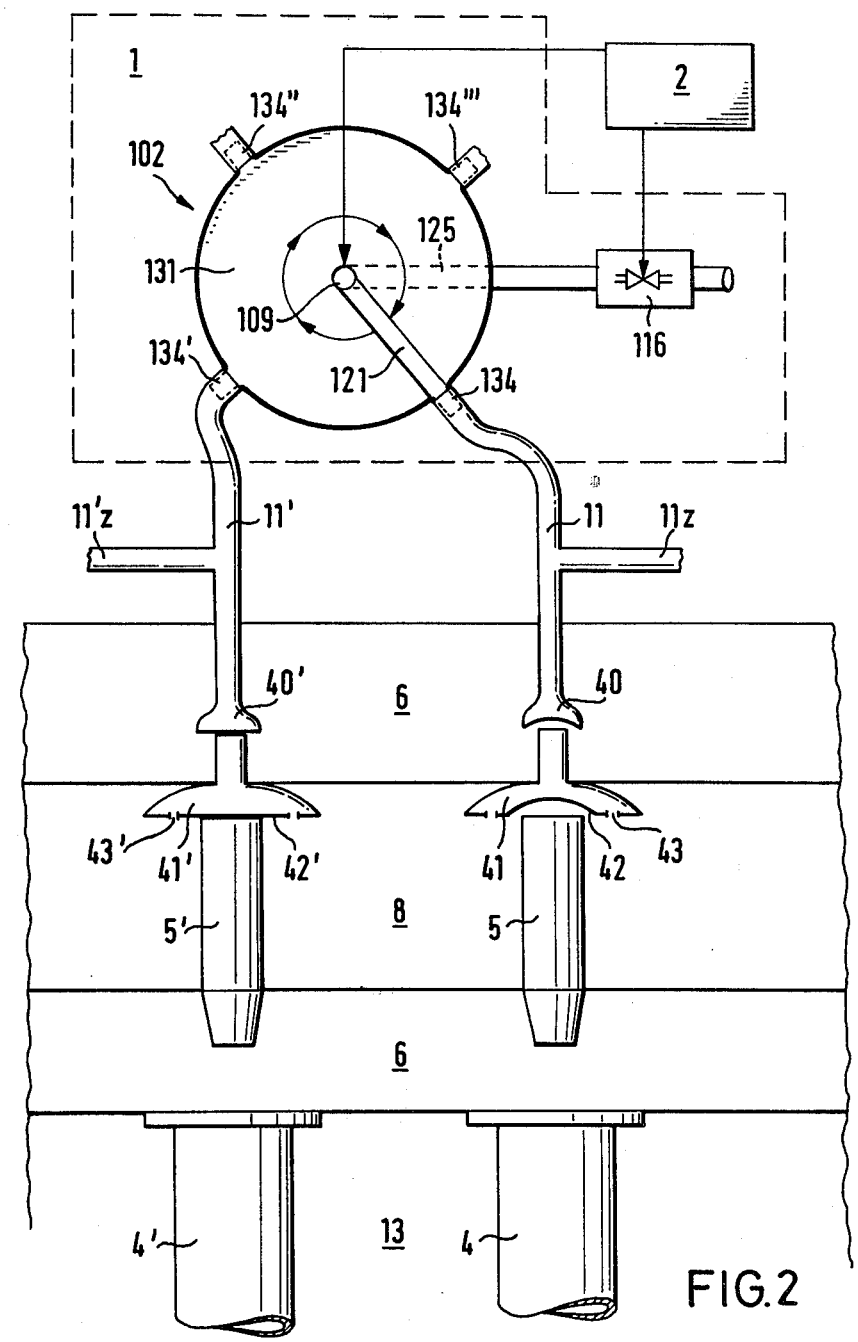
Figure 3:
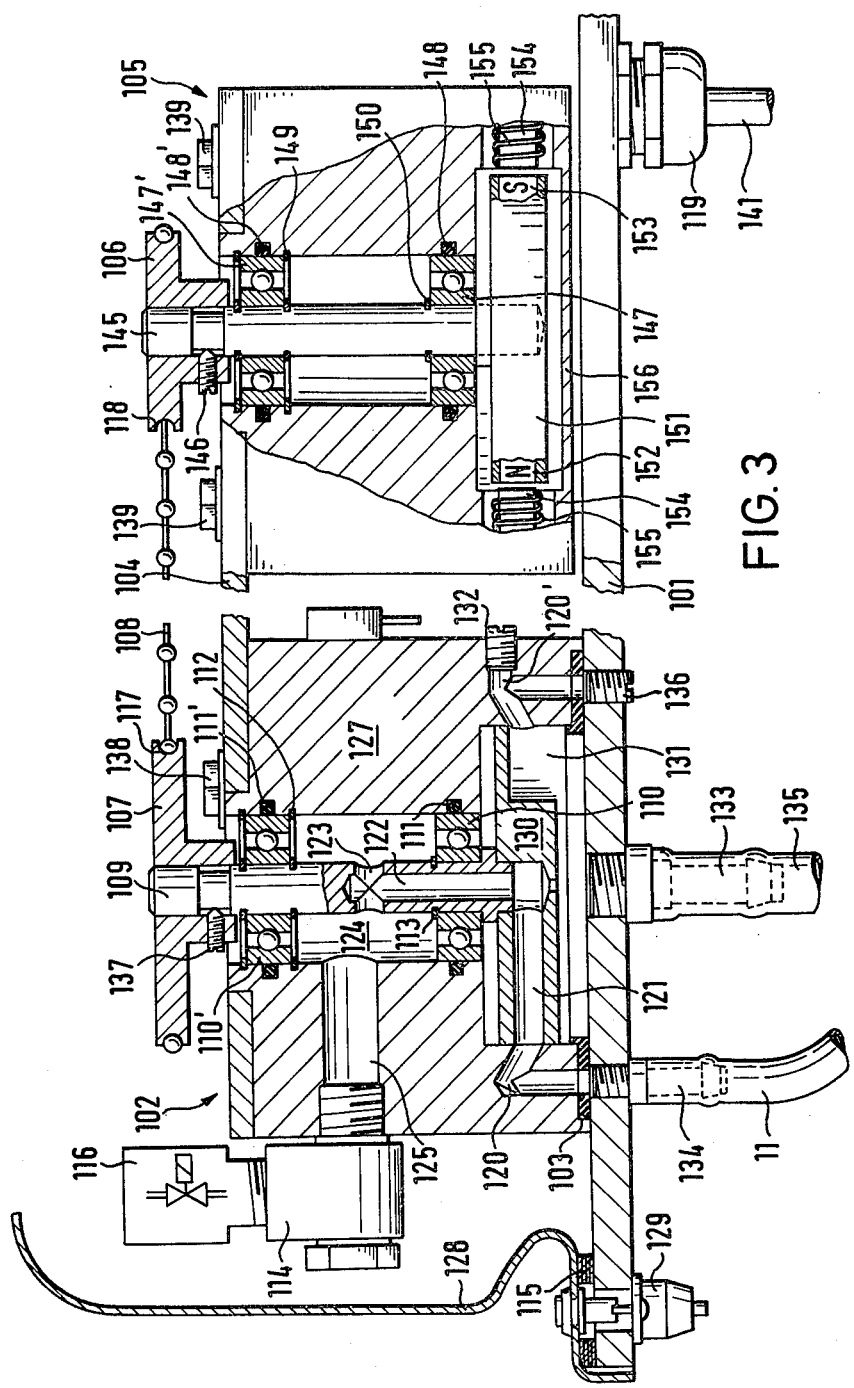
Figure 4:
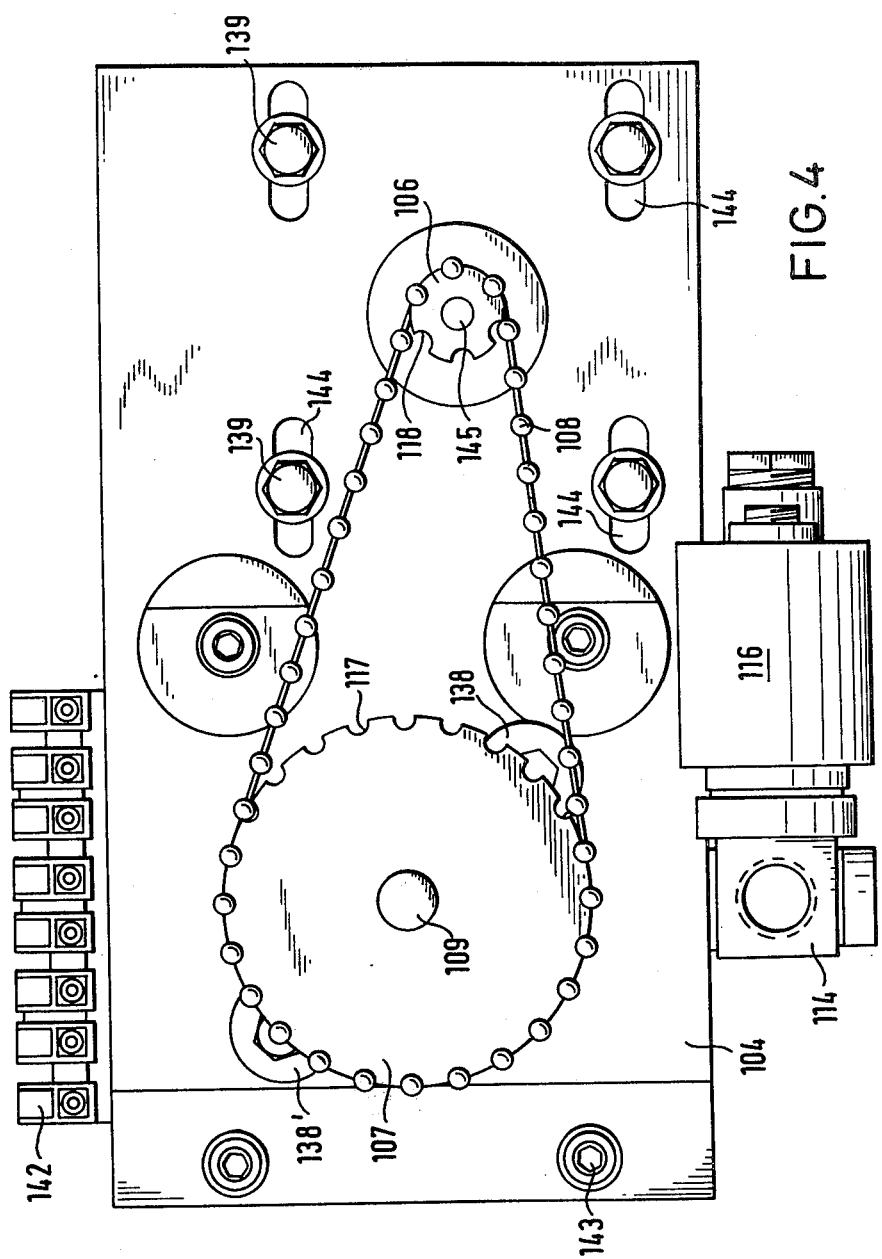
Figure 5:
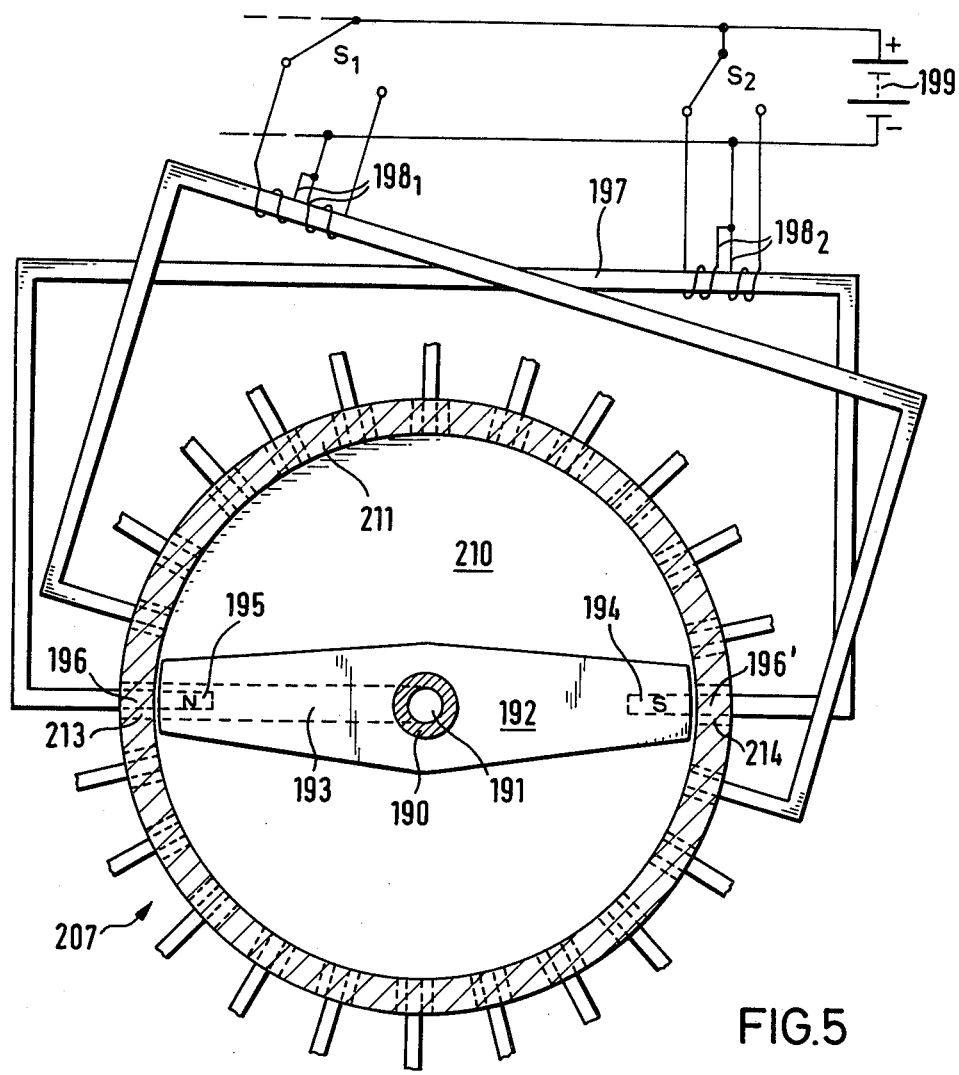
Figure 6:
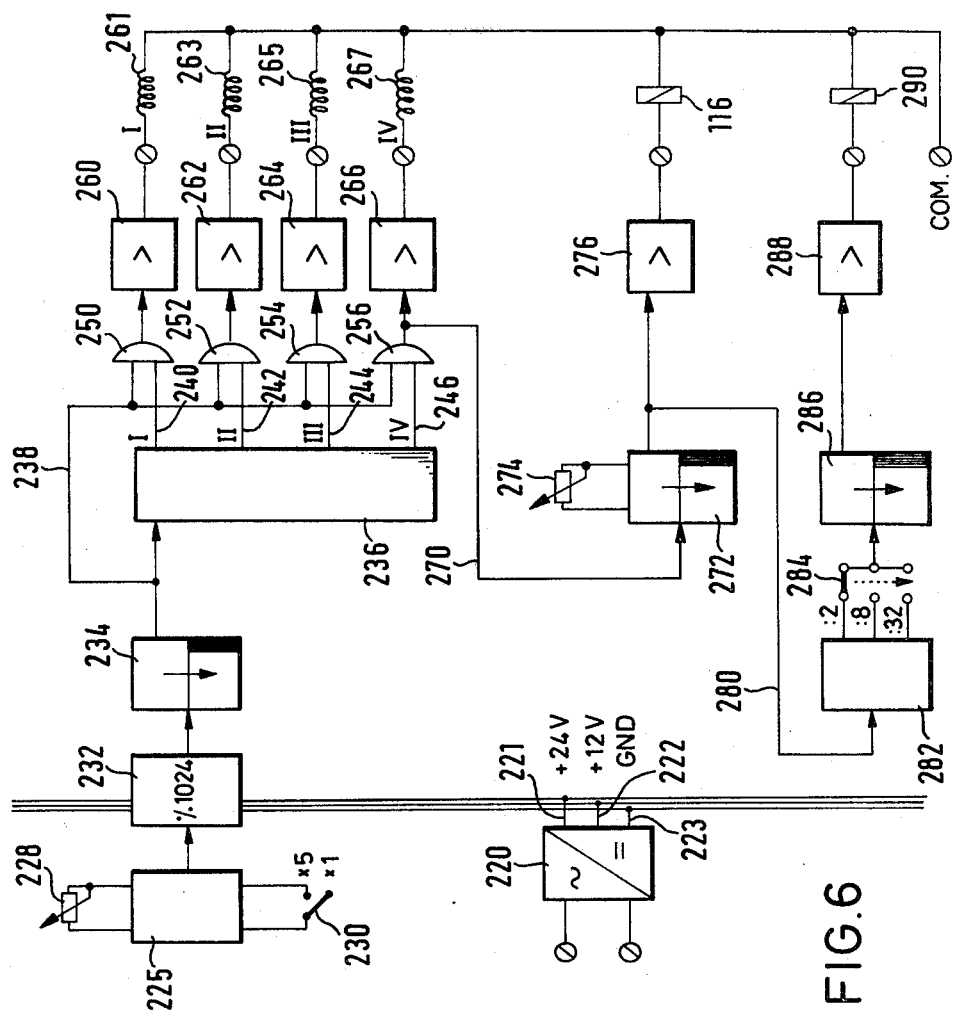

The drawings show:

FIG. 1 a complete low pressure filter;

FIG. 2 a schematic representation of the filter control system;

FIG. 3 an enlarged schematic sectional representation of a portion of the filter control system;

FIG. 4 a top view of the portion of the filter control system represented in FIG. 3;

FIG. 5 a schematic representation of a drum distributor designed as a stepping motor;

FIG. 6 a schematic diagram of the electronic control unit; and

Figure 7:
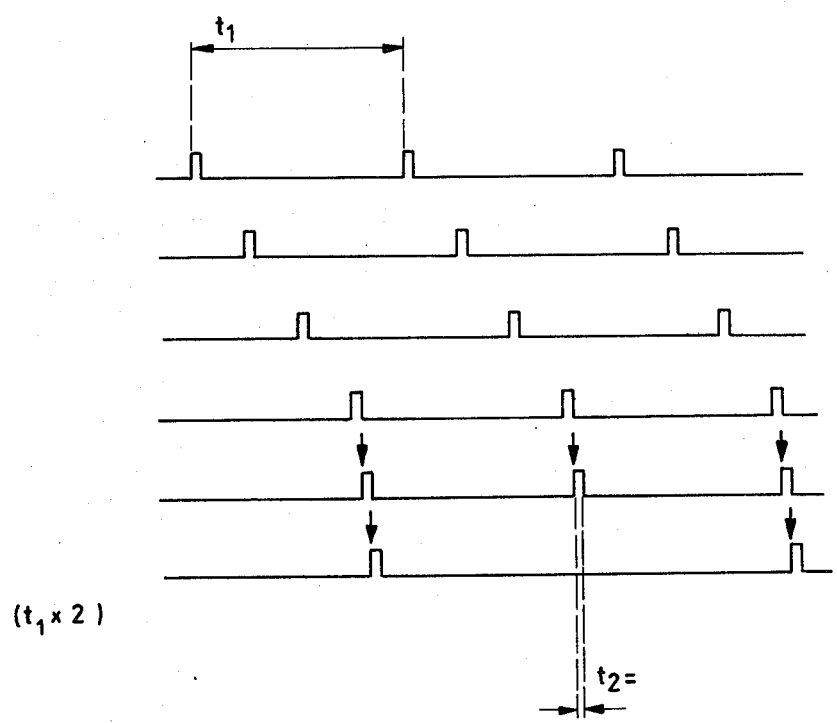

FIG. 7 the pulse pattern emitted by the diagram according to FIG. 6.

The low pressure filter shown in FIG. 1 has a cylindrical casing wall 3 and is essentially divided into a dust-laden air chamber 13, a clean air chamber 6 and a scavenging air tank 8. The dust-laden chamber 13 is separated from a discharge funnel 15 by a movable bottom 14. Instead of the movable bottom 14, another lock for the connection of the dust-laden air chamber 13 towards the outside can be provided. The filter has additionally an inlet socket 16 through which the dust-laden air is supplied into the dust chamber 13. The dust-laden air chamber is separated from the clean air chamber 6 by means of a covering plate 12. Several filter hoses 4, 4' are suspended from the covering plate 12. The filter hoses consist essentially of a cylindrical support 18 and a tube-shaped filtering tissue placed over it. Each filter hose has an opening which is free towards the top through which the air cleaned by the filtering tissue can freely flow out. The cleaned air flows into the clean air chamber 6 and from there, through an outlet socket 17, into the open air or back into the operating process.

The scavenging air tank 8 is arranged within the clean air chamber 6 and at a distance above the dust-laden air chamber 13 in such a manner that the discharged air can freely flow into the clean air chamber 6.

Oil-free and condensation water-free compressed air of about $1.5 \times 10^5$ N/m² ($1.5 \times 10^5$ Pascal or 1.5 bar or 0.5 atü excess presure) acts on the scavenging air chamber 8 through a piping 9 from a low pressure air compressor 10, for example, a disk piston compressor. The pressure prevailing in the scavenging air tank 8 is thus about 0.5 bar above that in the clean air chamber 6 in the illustrated embodiment. The scavenging air tank has a sufficient capacity for the supply of the compressed air necessary for the scavenging of the filter hoses.

The scavenging blasts are blown into the filter hoses 4, 4' by means of the blow nozles 5, 5' arranged in the scavenging air tank 8. The blow nozzles 5, 5' are centrally arranged above the filter hoses 4, 4' in the scavenging air tank and project from the scavenging air tank on the outlet side. On the inlet side, they are sealed against the outside space and the scavenging air tank 8 by means of a diaphragm valve arrangement 7, 7' in their idle position. A compressed air hose 11 leads from each diaphragm valve arrangement 7, 7' to the electrical-fluidal control means 1 which are arranged at the upper part of the filter. The electrical-fluidal control means 1 are activated by an electronic control unit 2, which is arranged on the filter wall at a servicing level, through a line 20. Preferably, the low pressure 10 is also controlled by the control unit 2 through a line 19, particularly for cutting the compressor in and out.

An essential element in the electronic control unit is an electronic timing pulse generator 225 (FIG. 6) which is installed in front of the entire control system as a quasi electronic precision clock. An oscillator crystal is, for example, suitable as such an electronic precision clock. Based on the electronic clock signals, the diaphragm valve arrangements 7, 7' are cyclically controllable through the compressed air hoses 11 with the help of the electronic control unit 2 and the subsequent fluidal control means 1 in order to have compressed air thrusts act cyclically on the filter hoses 4, 4'. The dust falling off the oustide wall of the filters after each scavenging action is collected on the bottom 14 designed as a slide and can be withdrawn through the discharge funnel 15. A scaling hammer (not shown) can be provided in the area of the discharge funnel 15 which is periodically controllable by the electronic control unit in order to prevent the formation of bridges. In this way, an undesired blocking of the material is avoided in the area of the discharge funnel 15 or of the bottom 14, and thus an undesired pressure change in the dust-laden air chamber 13.

According to FIGS. 2 and 3, the diaphragm valve arrangements 7, 7' consist each of a valve diaphragm 42, 42' with a counter-pressure chamber 41, 41' arranged above it as well as the throttle openings 43, 43' connecting the counter-pressure chamber 41, 41' with the scavenging air tank 8 and the quick-action valves 40, 40' covering the counter-pressure chamber 41, 41' in the area of the clean air chamber 6. The valve arrangement consisting of the valve diaphragm 42, 42', counter-pressure chamber 41, 41' and throttle openings 43, 43' is known from the German Pat. No. 1 407 922. The quick-action valve 40, 40' is known from the German Pat. No. 2 233 529. According to FIGS. 2 and 3, the quick-action valves 40, 40' are connected with a drum distributor 102 through compressed air hoses 11, 11'. The drum distributor 102 has, in this instance, a drum recess 131 from which socket-shaped nipples 134, 134', 134'', 134 ''' project towards the outside and are connected with the compressed air hoses 11, 11'. A distributor arm 130 is supported in the drum distributor 102 in such a pivoting manner that an arm borehole 121 provided in the distributor arm 130 can be successively turned directly in front of the tube-shaped nipples 134 to 134'''. The arm borehole 121 passes over into a shaft borehole 122 provided in the turning shaft 109. The shaft borehole 122 passes over into a cross borehole 125 provided in the distributor block 127 of the drum distributor 102 and at the outlet of said cross borehole 125 an electropneumatic valve 116 is connected which can be activated through a solenoid.

A low pressure fluid, in the most simple case compressed air, acts on the drum distributor through a main bore 135 and a main nipple 133. This low pressure air pushes the quick-action valves 40, 40' against the sockets of the counter-pressure chambers 41, 41' of the diaphragm valves 42, 42' which project into the clean air chamber 6. In this way, the pressure prevailing in the scavenging air chamber 8 also prevails in the counter-pressure chambers 41, 41' owing to the throttle openings 43, 43'. The result of this is that also the valve diaphragms 42, 42' are pushed against the blow nozzles 5, 5' and seal these air-tight against the scavenging air chamber 8. The described pressure or diaphragm conditions exist also when the arm borehole 121 is aligned with one of the nipples 134 to 134''' and the air relief valve 116 is closed.

If the air relief valve 116 is now opened—this situation is shown in FIG. 2 with the valve arrangement on the right—the quick-action valve 40 is spontaneously lifted off the socket of the counter-pressure chamber 41 so that there is a spontaneous pressure drop in the counter-pressure chamber 41. This, in its turn, results in the fact that the valve diaphragm 42 is spontaneously lifted off the blow nozzle 5 and a scavenging thrust acts upon the filter hose 4.

With a larger number of filter hoses 4, it is advantageous to connect several diaphragm arrangements 7, 7' through compressed air branch lines 11'z with a tube-shaped nipple 134 of the drum distributor 102. The control components can be reduced by means of this measure.

According to FIG. 2, the electronic control unit 2 controls the air relief valve 116 and the drum distributor 102, more exactly the turning of its distribution arm 130 with the arm borehole 121 provided therein. With the electronics being designed accordingly, this measure has the advantage that the duration of the scavenging action and the intervals between the scavenging actions are controllable or changeable independently of each other. It goes without saying that, in this instance, the air relief valve 116 and the drum distributor 102 are controlled independently of each other only insofar as the air relief valve 116 only opens when the arm borehole 121 is aligned with a nipple 134 to 134'''.

According to FIG. 3, the drum distributor 102 is mounted on a base plate 101. Boreholes are provided in the base plate 101 through which the tube-like nipples 134 project. The nipples 134 pass over into angular boreholes 120 which are bored out in the drum distributor block 127. The angular boreholes 120 end in the drum recesses 131 in the drum distributor 102. The ends of the nipples 134 projected from the base plate 101 are shaped so as to give sufficient hold to the distributor hose 11 pulled over these nipple ends 134. It goes without saying that the hose 11 can also be fastened on the nipple 134 with hose clips. The drum distributor recess 131 has a cylindrical shape. The mouths of the angular boreholes 120 in the drum distributor recess 131 are arranged at the same angular distance from each other. The embodiment, shown on the right-hand side of FIG. 3, of an angular borehole 120' indicates an additional connection possibility for a hose 11. In the case of the angular borehole 120', a hose 11 can be fastened with the help of a nipple on the lateral wall of the drum distributor 102 as well as—as in the case of the angular borehole 120—underneath the base plate 101. Also, one hose each can be fastened simultaneously on the two outlets of the angular borehole 120'. These hoses are then connected in parallel in relation to the angular borehole 120' and correspond to the two pressure hoses 11 and 11'z or 11' and 11'z in FIG. 2. In case one or both outlets of the drum distributor borehole 120' are not required, they can be closed in a pressure-tight manner by means of stoppers 132 and 136. This solution has the advantage that the very same drum distributor 102 can be used for a varying number of filter hoses 4, 4' or pressure hoses 11, 11' assigned to them whereby, depending on the number of the filter hoses 4, 4' to be scavenged, individual angular boreholes 120 or 120' are opened or closed with stoppers 132 and 136.

An additional tube-shaped nipple, the main nipple 133, is led through the base plate 101. The main nipple 133 is connected with a low pressure source, for example, the low pressure compressor 10, through the supply pressure hose 135. Low pressure air acts upon the drum distributor recess 131 and, proceeding from it, upon the arm borehole 121 and the subsequent space through the main nipple 133. This admission of low pressure air ensures that the diaphragm valve arrangements 7, 7' or the quick-action valves 40 and 40' as well as the valve diaphragms 42 and 42' respectively close off the spaces underneath. Gaskets 103 are arranged between the drum distributor 102 and the base plate 101 in order to guarantee a pressure-tight closure of the drum distributor 102 vis-a-vis the base plate 101.

The distributor arm 130 is pivoted in the drum distributor recess 131. For this purpose, the distributor arm 130 is fastened to a shaft 109 which is supported in an axial borehole 124, extending through the drum distributor block 127, through ball bearings 110, 110'. The ball bearings 110 and 110' are held in the axial borehole 124 by means of retaining rings 112 and 113.

A concentric opening 122 extends through the shaft 109 in the axial direction and which passes over into the arm borehole 121 with its end on the side of the distributor arm and into a cross borehole 123 with its other end. The cross borehole 123 ends in the axial borehole 124 in the drum distributor block 127. The axial borehole 124 is connected in a fluidal manner with the air relief valve 116, designed as an electropneumatic valve, through a cross borehole 125 provided in the drum distributor block 127. The air relief valve 116 is fastened on the drum distributor block 127 through an angular swiveling distributor 114.

O-rings 111 and 111' are arranged between the wall of the axial borehole 124 in the distributor block 127 and the ball bearings 110 and 110'. This measure has the advantage that the ball bearings 110 and 110' can be supported with simple seats in the axial borehole 124 but are, nevertheless, connected in a pressure-tight manner with the wall of the axial borehole 124.

A sectional disk 107 is fastened, in an adjustable manner, on the end of the shaft 109 projecting from the drum distributor block 127 by means of a threaded screw 137. The sectional disk 107 has recesses 117 into which the spheres of a sphere string 108 engage. The drum distributor 102 is connected with a stepping motor 105 through sectional disk 107 acting as reduction gear, sphere string 108 and a sectional disk 106 of said stepping motor 105. The section disk 106 has also recesses 118 for the spheres of sphere string 108 to engage in. The reduction ratio is selected at 1:4 in the shown embodiment. This means that, after four pulses supplied to the stepping motor or four advances of the block disk 151, designed as a rotor, of the stepping motor 105, the distributor arm 130, corresponding to the block disk 131, of the drum distributor 102 advances by one position in such a way that the arm borehole 121 is aligned with the mouth of the angular borehole 120 or 120'.

In the case of the embodiment according to FIGS. 3 and 4, a unipolar stepping motor is provided with four stator coils 155 or eight stator poles 154 and a stepping angle of 15°. The drum distributor 102 shown in the represented embodiment has 24 angular boreholes 120, 120' which, accordingly, have also an angular distance of 15° between each other.

The stepping motor 105 is suspended on a motor plate 104 by means of adjusting screws 139. The adjusting screws 139 are guided in slotted holes 144. The slotted holes 144 extend in longitudinal direction of the motor plate 104. In this way, a longitudinal shifting and thus a possibility of adjustment is given for the stepping motor 105.

For the mutual adjustment of the distribution arm 130 and the rotor or block disk 151, an additional threaded screw 146 is provided on the sectional disk 106, besides the threaded screw 137 on the section disk 107. The threaded screw 146 engages in the motor shaft 145. At least an advance adjustment is possible by means of the threaded screws 137 and 146. A fine adjustment is possible by means of the additional adjusting screws 138 and 138' in such a way that the arm borehole 121 is aligned with the angular borehole 120 exactly then when the magnet armature poles 152, 153 are opposite the magnetizable stator poles 154 or the stator coils 155. The adjusting screws 138 or 138' permit a swiveling of the motor plate 104 in relation to the drum distributor block 127. In the shown embodiment, the stepping motor 105 is only fastened to the motor plate 104 and keeps a distance from the base plate 101. This facilitates the swiveling of the stepping motor. The stepping motor is closed off from the base plate 101 by means of a covering plate 126.

In order to illustrate the aforementioned "clear reproduction" of the geometric arrangement of the stator poles 154 on the mouths of the angular boreholes 120 in the drum distributor 102 by means of the block disk 151 acting as rotor, the reduction gear consisting of the sectional disk 106, the sphere string 108 and the sectional disk 107 and the distributor arm 130, the stepping motor 105 and the drum distributor 102 are designed largely in the same way. Accordingly, the block disk 151—as is the distributor arm 130—is also supported by a cylindrical recess in the stepping motor block by means of the motor shaft 145, the ball bearings 147, 147', the retaining rings 149, 150 and the O-rings 148', 148'.

Instead of the shown stepping motor 105, other commercially available stepping motors can also be used.

The supply lines for the electrical energy are led to the stepping motor 105 and to the air relief valve 116 through the control and supply cable 141. The control and supply cable 141 is held on the base plate 101 by means of a screw-type conduit fitting 119. The stepping motor 105 and the air relief valve 116 are connected to the control and supply cable 141 through a strip clamp 142.

The electronic control unit 2 has been designed in such a way that the air relief valve 116 receives a control pulse when the arm borehole 121 is aligned with the mouth of an angular borehole 120. The control pulse opens the air relief valve 116 so that the pressure drops in the chamber or chambers of the assigned diaphragm valve arrangement 7 and a scavenging action is initiated. The duration of the scavenging action is determined in part by the duration of the opening of the air relief valve 116.

The arrangement of the fluidal control means and electromechanical transducer elements shown in FIGS. 3 and 4 can now be designed in an explosion-proof way by screening these elements in a gas-tight manner from the outer space by means of a hood 128 and the base plate 101 and by filling them with inert gas. For this purpose, a gas-tight hood 128 is fastened in a gas-tight manner on the base plate 101 through a gasket 115 by means of a snap closure 129. Inert gas under low pressure is now supplied to the arrangement shown in FIGS. 3 and 4 through the main nipple 133.

According to FIG. 5, the drum distributor 207 is also a stepping motor. Accordingly, it has initially a design as shown in FIG. 5 consisting of a drum distributor with a cylindrical drum recess 210, a drum distributor or rotor arm 192 pivoting in it and rotor arm borehole 193 provided in the rotor arm 192. The rotor arm borehole 193 corresponds to the arm borehole 121 of the embodiment shown in FIGS. 3 and 4. The rotor arm is fastened to a rotor arm shaft 190 which is designed, for example, to correspond to the embodiment of shaft 109 shown in FIGS. 3 and 4. Also, the mounting support of the rotor arm shaft 190 corresponds to the mounting support of the arm shaft 109 of the drum distributor 102 shown in FIG. 3. The rotor arm borehole 193 is connected with the air relief valve 116 through a rotor arm shaft borehole 191. The fluidal connection is, for example, designed in accordance with the embodiment shown in FIG. 3.

Drum wall boreholes 213 and 214 are provided in the drum wall 211 which correspond to the angular boreholes 120 and 120' according to FIG. 3. The rotor arm is pivoted in the drum recess in such a manner that its rotor arm borehole 193 can be cyclically swiveled in an aligned position with the drum wall boreholes 213, 214. The drum distributor 207 designed as a stepping motor has a stationary permanent north pole 195 arranged towards the mouth of the rotor arm borehole 193 in the shown embodiment. The rotor arm 192 is designed symmetrically to the rotor arm shaft and has a permanent south pole 194 at its end opposite to the north pole 195. These are actually not magnetic monopoles but, nevertheless, the north and the south poles are shown as individual poles since it is only important that the two opposite ends of the rotor arm 192 has a corresponding magnetic polarity at least in a partial area. For this purpose, for example, the smallest permanent magnets which are commercially available and arranged at the opposite ends of the rotor arm 192 are suitable.

Furthermore, stator poles 196, 196' are arranged in a stationary manner in relation to the drum wall boreholes 213 and 214. The stator poles consist of a magnetizable material and are connected with each other through a crossbar 197. Each stator crossbar carries a stator winding $198_1$ or $198_2$. In the shown embodiment, the stator crossbar windings $198_1$ and $198_2$ are wound for the operation of a unipolar stepping motor. The stator poles 196, 196' are capable of being reversed through the stator windings $198_1$, $198_2$, the switches $S_1$, $S_2$ and the battery 199. By the emission of corresponding pulses to the switches $S_1$, $S_2$, the rotor arm borehole 193 can now be successively turned into an aligned position to the drum wall boreholes 213 and 214. The advantage of this arrangement lies in that fact that an adjustment between two separate units, i.e. a drum distributor and a stepping motor, is not necessary.

Preferably, the drum wall 211 and the rotor arm 192 consists of non-magnetizable material. However, the stator poles 196, 196' and the permanent magnets 194, 195 can instead be magnetically insulated from the other parts by means of magnetic shielding.

In accordance with the block wiring diagram shown in FIG. 6, the control proceeds from an oscillator 225. The oscillator 225, the subsequent electronic elements and the electromechanical transducer elements are supplied with electrical energy by a rectifier 220 provided with a connection to the main power supply. The rectifier 220 has three outputs 221, 222 and 223 of which, in the given sequence, the first one is on a potential of 24 volts, the second one on a potential of 12 volts and the third one on an earth potential.

The intervals of the pulses emitted at the oscillator output are controllable through a potentiometer 228. Another control of these pulse intervals is possible through a selector switch 230 which permits a control of the pulse interval with the help of the potentiometer 228 within the range from 2 to 20 seconds in one of its positions and a control of the pulse interval within the range from 10 to 100 seconds in its other position. The respective switch positions are designated accordingly by $\times 1$ and $\times 5$.

The scavenging action interval is controllable with the help of the potentiometer 228 and the selector switch 230.

The oscillator 225 is followed by a binary divisor 232. In the shown embodiment, it is a $2^{10}$ binary divisor 232 which controls a monostable flip-flop circuit 234 responding to the decaying edge of the pulse. The monostable flip-flop circuit 234 defines the output pulse width which must be at least of such a size that the stepping motor can be moved from one stator pole to the next one within this period of time. The pulses emitting from the monostable flip-flop circuit are supplied to a counter 236 designed "as 1-out-of-4 decoder". Each counter output 240, 242, 244, 246 is clearly assigned to one control input of one of four AND logic circuits 250, 252, 254 and 256. The respective other control input of the two-stage AND logic circuits 250 to 256 is connected with the output of the monostable flip-flop circuit 234 through a joint branch line 238. In this circuit, the pulse width emitted by the monostable flip-flop circuit 234 determines the response duration of the logic AND circuits 250 to 256. The counter outputs 240 to 246 fix the respectively responding AND logic circuit. The logical AND logic circuits 250 to 256 are followed by four drive stages 260 to 266 whereby each drive stage is controlled by exactly one AND logic circuit 250 to 256. The drive stages control the selector switches for four stator coils 261, 263, 265 and 267 of a unipolar stepping motor.

In the shown embodiment, one proceeds from a stepping motor with four stator coils or eight stator poles and a reduction ratio of 1:4 between the stepping motor and the drum distributor.

The AND logic circuit 256 assigned to the fourth output 246 of the counter 236 controls the input of a monostable flip-flop circuit 272. Also this monostable flip-flop circuit responds to the decaying edge. Accordingly, it has been ensured that the monostable flip-flop circuit emits only a signal only when the stepping motor has performed a step and, accordingly, the distributor arm in the drum distributor is aligned with the corresponding angular borehole 120 or drum wall borehole 213. The monostable condition of the flip-flop circuit 272 and thus the width of the pulse emitted by it is controllable by means of a potentiometer 274. The monostable flip-flop circuit 272 controls a driver stage 276 and thus, in its turn, the air relief valve 116. Accordingly, the scavenging duration is independently changeable from the intervals between the scavenging actions whereby the independence goes, of course, only to the extent that the scavenging valve is kept open as long as the distributor arm and the diaphragm valve arrangements are fluidally connected with each other.

The output of the monostable flip-flop circuit 272 is connected with the input of a binary counter 282 through a control line 280. The binary counter 282 has three outputs, i.e. :2, :8, :32, which can be connected each with the control input of a monostable flip-flop circuit 286 through a selector switch 284. Accordingly, the monostable flip-flop circuit 286 can be selected after every other, after every eighth or after every thirty-second pulse. Also the monostable flip-flop circuit 286 responds to the decaying pulse edge. The output of the monostable flip-flop circuit 286 is connected with the input of a drive stage 288. The drive stage 288 controls a hammer valve 290 for the activation of the scaling hammer. Owing to the response behavior of the monostable flip-flop circuit 286, it has also been ensured in this case that the scale hammer responds only after the termination of the scavenging process.

The diagram of the pulses emitted from the circuit according to FIG. 6 is given in FIG. 7. The width of the pulses assigned to the coils 1, 2, 3 and 4 is determined by the triggering period of the monostable flip-flop circuit 234. The mutual pulse interval is fixed by the oscillator 225 or the potentiometer 228 and the selector switch 230. The shifting of the pulses from coil to coil results from the counter 236 and the subsequent AND logic circuits 250 to 256.

The rising edge of the pulse assigned to the scavenging agrees with the decaying edge of the pulses for coil 4. The width of the scavenging pulses and thus the duration of the scavenging is controllable by means of the potentiometer 274. On the basis of the shown diagram of the pulses, it is demonstrated that the duration of the scavenging action and the intervals between the scavenging actions are, to a large extent, controllable independently of each other.

The rising edge of the pulses assigned to the scaling agrees with the decaying edge of every other scavenging pulse. By switching-over the switch 284, it can be ensured that each scaling pulse only agrees with the eighth or even thirty-second scavenging pulse, i.e. the scaling hammer is only put into action after every eighth or thirty-second scavenging pulse.

In accordance with FIG. 1, a unit is provided in the circuit according to FIGS. 6 and 7 which is not shown but which controls the low pressure air compressor 10, it cuts it in and out. Preferably, a cut-in pulse is emitted by this circuit before the control of the stepping motor 105 is taken over.

We claim:

1. In a filter apparatus including a housing having a plurality of filter hoses and scavenging means therefor, a process for the control of the control dimensions of the cyclic counter-scavenging of said filter hoses by the cyclic fluid activation of diaphragm valves associated with said filter hoses, said process comprising:
   providing electronic timing signals for a predetermined scavenging cycle;
   transforming said electronic timing signals into at least two groups of independently changeable control signals from said timing signals for the fluidic activation of the diaphragm valves; and
   influencing said control dimensions of each of said scavenging cycles by applying said control signals to electro-mechanical transforming elements controlling the fluidic activation of said diaphragm valves.

2. The process of claim 1 wherein said control signals are transformed from said timing signals by means of electric coupling elements.

3. In a filter apparatus including a housing having a plurality of filter hoses and scavenging means therefor, a filter control system for the cyclic counter-scavenging of said filter hoses comprising:
   a fluid activated diaphragm valve for each of said filter hoses;
   an electronic circuit including means to produce timing signals;
   a first electro-mechanical transformer unit receiving said timing signals and controllable thereby, said first electro-mechanical transformer unit positioned and arranged to initiate the activation of said diaphragm valves; and
   a second electro-mechanical transformer unit receiving said timing signals and controllable thereby, said second electro-mechanical transformer unit also positioned and arranged to initiate the activation of said diaphragm valves,
   wherein said first and second electro-mechanical transformer units are independently controllable.

4. Filter apparatus according to claim 3, wherein said second electro-mechanical transformer unit includes a drum distributor.

5. The filter apparatus of claim 4 wherein said drum distributor has an inlet and at least one outlet and wherein said first electro-mechanical transformer unit includes an air relief valve positioned at said inlet and said drum distributor, wherein the time interval between two activations of said air relief valve and the duration of the valve activations are changeable independently of each other whereby the time interval between two valve activations is adjustable within the range from 0.5 seconds to 10 minutes and the duration of the valve activation is in the range from 30 milliseconds to 1 second.

6. The filter apparatus of claim 5 wherein said drum distributor has an arm and said second electro-mechanical transformer unit has a stepping motor connected with said arm of said drum distributor as the driving force thereof, said stepping motor being connected with said arm through an adjustable reduction ratio reduction drive.

7. The filter apparatus of claim 6, wherein said stepping motor and said drum distributor are constructed and arranged in a parallel-axial manner so that said stepping motor can be pivoted in a plane perpendicular to the axes of said stepping motor and said drum distributor, in an angular range of approximately 15°.

8. The filter apparatus of claim 6 wherein said drum distributor itself is constructed as a stepping motor.

9. The filter apparatus of claim 6 wherein said stepping motor, said drum distributor and said air relief valve form a first component and the electronic circuit forms a second component.

10. The filter apparatus of claim 6 wherein said electronic circuit has a timing pulse generator, a counter following the timing pulse generator, the counter outputs of said counter being assigned to the phase windings of the stepping motor, and a monostable flip-flop circuit following one of said outputs of said counter, said flip-flop circuit being connected with the control input of said air relief valve whereby the pulse interval of said timing pulse generator and the relaxation time of the monostable flip-flop circuit are changeable independently of each other and the monostable flip-flop circuit responds to the decaying edge of the counter output pulse.

11. The filter apparatus of claim 10 including a hammer valve, said monostable flip-flop circuit for the control of said air relief valve is connected to an additional monostable flip-flop circuit which is constructed and arranged to control said hammer valve.

12. The filter apparatus of claim 5, wherein said air relief valve is constructed so as to be an electro-pneumatic valve and is closed when in a currentless condition.

13. The filter apparatus of claim 5, including a control system connected to said electronic circuit to initiate each timing and signal for the scavenging process including a further control system connected to the air relief valve to initiate each scavenging process.

14. The filter apparatus of claim 4 including a plurality of servo valves positioned upstream from each said diaphragm valve and connected with one outlet of said at least one outlet of said drum distributor wherein said plurality of servo valves are located at each said at least one outlet of said drum distributor.

15. The filter apparatus of claim 4 wherein said drum distributor includes a rotary distributor and is supported on a block wherein said rotary selector of the drum distributor is supported on ball bearings and the ball bearings rest pressure-tight through O-rings against the wall of an axial borehole in said drum distributor block.

16. The filter apparatus of claim 3 wherein said electro-mechanical transformer units are surrounded by a casing which is sealed pressure-tight and filled with an inert gas.

17. The filter apparatus of claim 3 including a scaling hammer controllable by said timing signals of said electronic circuit and connected with said electronic circuit.

* * * * *

UNITED STATES PATENT AND TRADEMARK OFFICE
CERTIFICATE OF CORRECTION

PATENT NO. : 4,299,597
DATED : Nov. 10, 1981
INVENTOR(S) : Hans Oetiker, et. al.

It is certified that error appears in the above—identified patent and that said Letters Patent is hereby corrected as shown below:

On The Title Page, Inventors information to read as follows:

[75]--- Inventors: Hans Oetiker, St. Gallen; Emanuel Kummer, Gossau; Kurt Rusterholz, Jona; Hermann Gaemperle, Bronschhofen, all of Switzerland Signed and Sealed this Sixteenth Day of February 1982

[SEAL]

Attest:

GERALD J. MOSSINGHOFF

Attesting Officer

Commissioner of Patents and Trademarks